United States Patent [19]

Canales-Santos et al.

[11] Patent Number: 4,705,550
[45] Date of Patent: Nov. 10, 1987

[54] PROCESS FOR PROVIDING A THERMICALLY HOMOGENEOUS FLOW OF MOLTEN GLASS

[75] Inventors: Enrique Canales-Santos, Garza Garcia; Guillermo Carro-de-la-Fuente, Ciudad Guadalupe; Saul R. Ruiz-Ontiveros, Garza Garcia, all of Mexico

[73] Assignee: Vitro Tec Fideicomiso, Monterrey, Mexico

[21] Appl. No.: 829,272

[22] Filed: Feb. 13, 1986

[51] Int. Cl.$^4$ ............................ C03B 5/26; C03B 5/08
[52] U.S. Cl. ......................................... 65/32; 65/99.2; 65/132; 65/134; 65/182.1
[58] Field of Search ................... 65/32, 134, 121, 125, 65/126, 132, 99.2, 99.3, 99.4, 136, 182.1

[56] References Cited

U.S. PATENT DOCUMENTS

| 3,332,763 | 7/1967 | Basler et al. | 65/99.4 X |
| 3,393,987 | 7/1968 | Plumat | 65/99.4 X |
| 3,726,656 | 4/1973 | Reid et al. | 65/121 |
| 4,087,268 | 5/1978 | Lentz | 65/126 X |

FOREIGN PATENT DOCUMENTS

| 46355 | 1/1971 | Japan | 65/99.2 |

Primary Examiner—Robert L. Lindsay
Attorney, Agent, or Firm—Abelman Frayne Rezac & Schwab

[57] ABSTRACT

A process for providing a thermally homogeneous flow of molten glass comprises introducing a stratified liquid layer of non-volatile evaporation resistant materials having density smaller than that of the molten glass, onto the surface of the molten glass contained within a feeding section of a forehearth.

8 Claims, 4 Drawing Figures

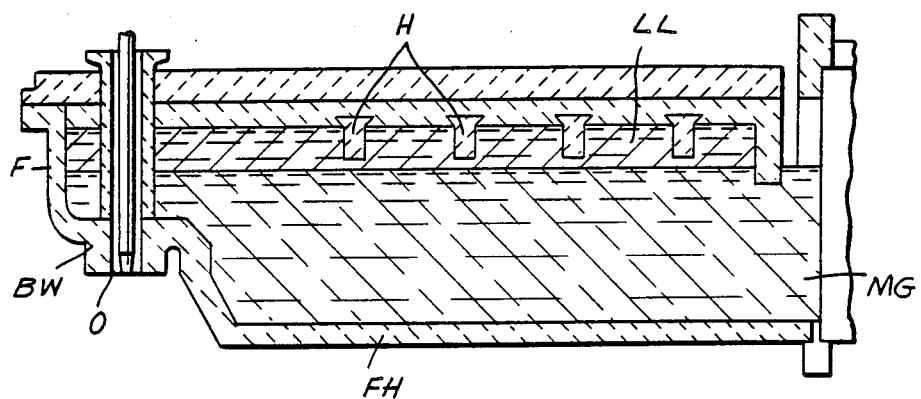
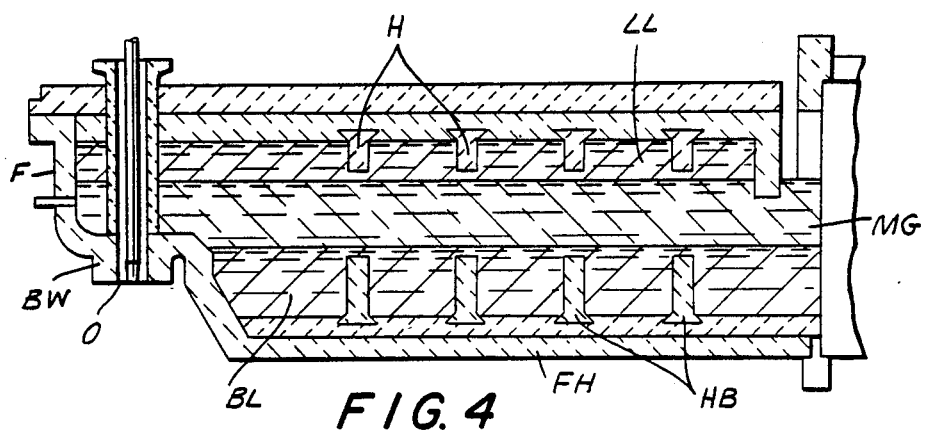

PROCESS FOR PROVIDING A THERMICALLY HOMOGENEOUS FLOW OF MOLTEN GLASS

FIELD OF THE INVENTION

The present invention is directed to a process for providing a thermally homogeneous flow of molten glass from a forehearth, and has particular application to the supply of molten glass to glassware forming machines.

BACKGROUND OF THE INVENTION

In the automatic production of glassware articles by processes known as blow and blow, press and blow and press, a flow of molten glass is continuously provided from a forehearth, and is formed into gobs for use in the forming of individual blown glassware articles in forming machines.

In order that the articles may be efficiently produced and properly formed, it is desirable that the molten glass supplied from the forehearth be as uniform and thermally homogeneous as is possible, in order to provide a uniform flow of molten glass from the feeder portion of the forehearth. This promotes uniform weight and a better shape of the glass gobs, and in turn promotes the formation of glassware articles having the required weight and wall thickness.

SUMMARY OF THE INVENTION

It is an object of the present invention, to provide a process for providing a uniform and thermally homogeneous flow of molten glass from a feeder portion of a forehearth, for subsequent use in machines for the fabrication of glassware articles.

It is another object of the present invention to provide a process in which convective currents of the molten glass are minimized and thermal homogenity throughout the glass mass is achieved.

By optimizing the thermal and mechanical homogenity of the molten glass, the volume/weight ratio of the glass gobs is optimized, and better shaped glass gobs are achieved and delivered to the glassware forming machine. In turn, production of defective articles is reduced, the operation of the forming machine is simplified, and idle times due to changes in the type of articles produced are reduced. Furthermore, energy saving is effected because of the "heat holding" effect and thermal conductivity of the liquid layers on the molten glass, this permitting a better distribution of heat in the glass.

A uniform flow of molten glass is achieved in accordance with the present invention, by providing a plurality of stratified liquid layers of smaller density than that of the molten glass on the surface of the molten glass in the feeding section of the forehearth. This produces a hydraulic phenomenon known as "selective withdrawal", and produces thermal stabilization throughout the molten glass mass.

This is due to the reduction of convective and turbulent currents in the molten glass and a reduction in static accumulations of the glass mass at the corners of the feeder. Such static accumulations cause deformation in the glass gobs ultimately formed from the molten glass.

The thermal conditioning of the molten glass is achieved by heaters in accordance with the required curve of temperature versus length of the forehearth, which curve can be as flat as desired in order to homogenize the temperature of the glass at the time it reaches the feeder.

According to the present invention, the thermal conditioning of the molten glass is greatly improved by employing a liquid layer which is capable of maintaining stratified densities therein.

Preferably, a liquid layer of greater density than that of the molten glass is positioned under the molten glass, and at the bottom of the conditioning section of the forehearth. This latter concept is known in the production of glass sheets by the process known as "floating".

These and other objects and advantages of the present invention will be apparent to persons skilled in the art from the following detailed description of the invention, as is illustrated in the accompanying drawings, in which:

BRIEF DESCRIPTON OF THE DRAWINGS

FIG. 3 is a longitudinal section of a forehearth, showing a liquid layer on the molten glass, in accordance with a first embodiment of the present invention; and FIG. 4 is a view similar to FIG. 3, showing a second embodiment of the present invention.

DETAILED DESCRIPTION OF THE INVENTION

Figure 1:
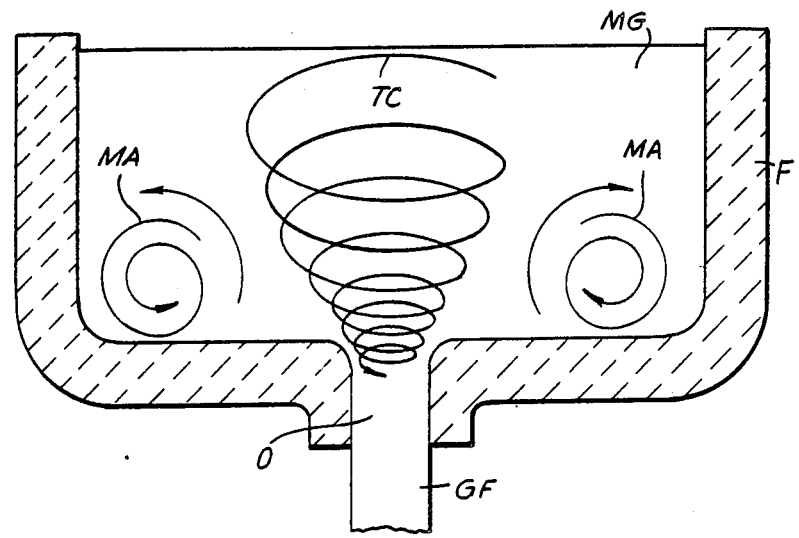
FIG. 1 is a schematic view of a feeder section of a forehearth used for providing a flow of molten glass in accordance of the previous art.
Figure 2:
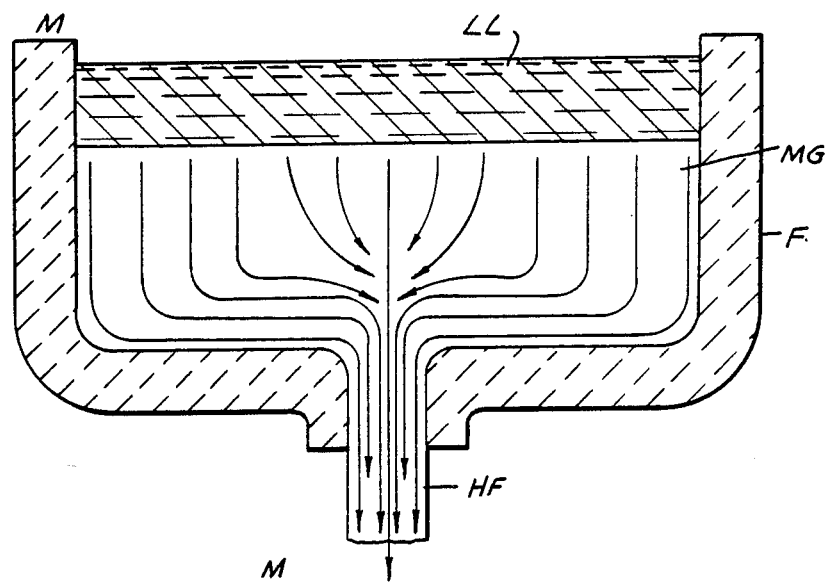
FIG. 2 is a schematic view of the known feeder section and illustrating a flow of molten glass as it is obtained in accordance with the present invention.

FIG. 1 shows a prior art feeder section F of a forehearth containing a mass of molten glass MG from which a glass flow GF is provided in accordance with the known process. The flow GF is not as uniform and thermally homogeneous as desired. This is because of the somewhat turbulent convection currents TC occurring in the glass at the orifice O of the feeder F, and due to the heat accumulation in the mass of the glass at the corners of the feeder F, as illustrated by the convoluted arrows MA.

To overcome the above mentioned drawbacks, the process of the present invention comprises introducing at least one liquid layer LL of a material having a small density than that of the molten glass MG, such as molten aluminum, or magnesium, or admixtures thereof, or admixtures of any other materials having a melting point which is smaller than that of the glass, at least in said feeder section F of the forehearth. In this manner, a uniform, laminar, smooth and homogeneous flow of molten glass HF is produced from all parts of the feeder F, as represented by the curved arrows.

The liquid layer LL can extend across the entire forehearth FH, as is illustrated in FIG. 3. Heaters H extend into the liquid layer LL to maintain it as a desired temperature. The molten glass MG, because the thermal conductivity of the liquid layer LL allows the molten glass to be homogeneously cooled or heated in accordance with the required curve of temperature versus length of the forehearth FH, which curve can be as flat as desired in order to homogenize the temperature of the molten glass throughout the whole extent of the forehearth FH.

The liquid layer LL is one having stratified densities, this permitting manipulation of the thermal conditioning of said molten glass MG. Additionally, dissimilar liquid layers can be provided overlying the molten glass mass MG, in order to enhance the effects previously discussed.

In order to protect the liquid layer LL against oxidation, a chamber (not illustrated) having an inert atmosphere, may be provided covering the top of the forehearth FH and the liquid layer LL.

As is illustrated in FIG. 4, and in order to further improve the thermal homogenity of the molten glass MG, a further liquid layer BL of a material denser than the glass, such as tin, can be positioned at the bottom of the forehearth FH, the further liquid layer BL reaching just up to the shoulder SH of the bowl BW of the feeder F. Further heaters HB can also be provided extending into the liquid layer BL for the thermal conditioning thereof.

Persons skilled in the art can readily determine the operational conditions of the process in order to adapt the process of the present invention the particular requirements. Furthermore, the materials of the liquid layers readily can be selected from available metals having the required characteristics for floating on or lying under the glass mass.

What is claimed is:

1. A process of forming a thermally homogenous flow of molten glass in the forehearth of a glass feeder, comprising:

feeding molten glass to said forehearth;

heating said molten glass within said forehearth to maintain it in said molten state and permitting said molten glass to stabilize while within said forehearth; and providing a continuous layer within said forehearth of dissimilar stratified molten metal materials, each of lesser density than said molten glass, and each of lower melting temperature than the temperature of said molten glass.

2. The process of claim 1, in which said dissimilar materials are immiscible dissimlar materials.

3. The process of claim 1, in which said dissimilar materials are aluminum and magnesium.

4. The process of claim 1, in which said stratified molten metal materials are submerged in an inert atmosphere.

5. The process of claim 1, including thermally conditioning said molten glass by thermally conditioning said stratified molten metal layer.

6. The process of claim 1, including floating said molten glass on a second molten metal layer of greater density than said molten glass.

7. The process of claim 6, in which said second molten metal layer is molten tin.

8. The process of claim 7, including thermally conditioning said molten glass by thermally conditioning said second molten metal layer.

* * * * *